June 3, 1952  B. C. DENNEY  2,598,979
MITER GAUGE
Filed Jan. 17, 1950
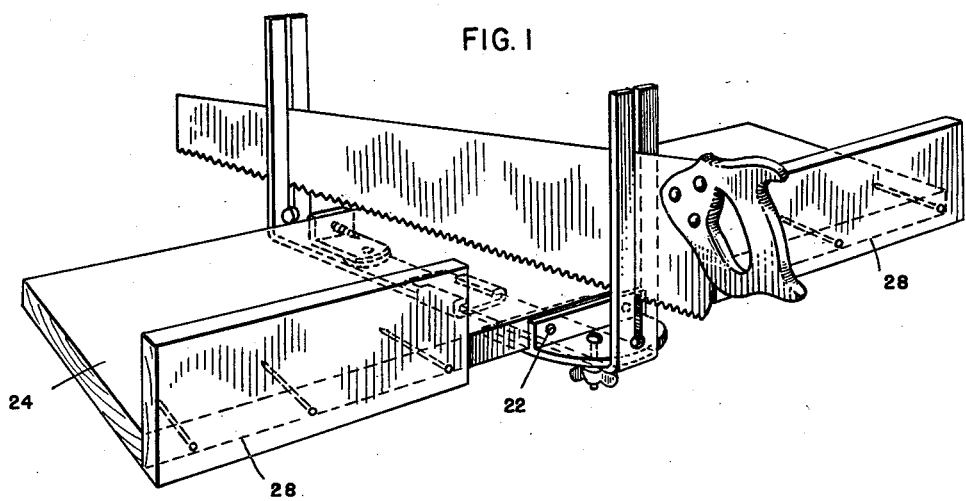
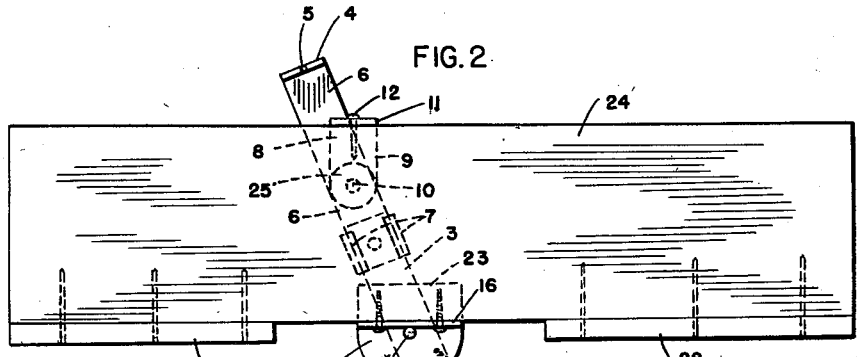
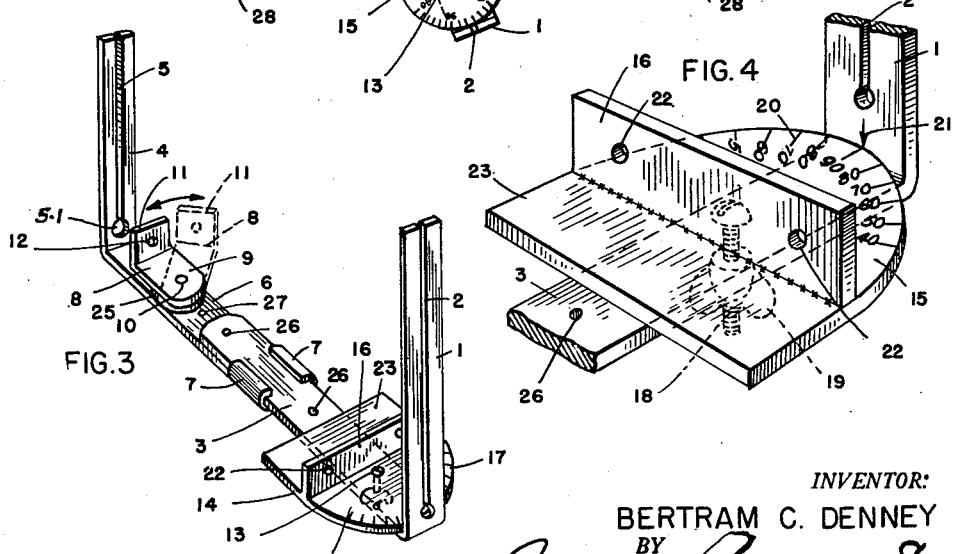
INVENTOR:
BERTRAM C. DENNEY
BY
ATT'YS

UNITED STATES PATENT OFFICE 2,598,979

MITER GAUGE

Bertram C. Denney, Chicago, Ill.

Application January 17, 1950, Serial No. 139,077

3 Claims. (Cl. 143—89)

This invention relates generally to devices for guiding a saw in making cuts at a selected angle with respect to the length of the board that is being worked upon.

The main objects of this invention are to provide an improved form of miter gauge that is compact in form and capable of being carried in knocked-down form in a workman's tool box; to provide a device of this kind that is capable of being assembled on the job by an unskilled workman so as to serve the purposes of a miter box; and to provide a structure of this kind which, while particularly designed for boards of the widths that are usually used for frame building construction for guiding a saw in the making of transverse cuts within the ranges usually provided for by miter boxes, is also readily adaptable for the guiding of a saw in making extremely sharp angular cuts, quite beyond the capacity of an ordinary miter box.

A specific embodiment of this invention is illustrated in the accompanying drawings in which:

Figure 1 is a perspective view showing the improved miter gauge attached to a board so as to form a miter box and positioned thereon for making a cut at right angles to the length of a piece of timber (not shown) that is to be worked upon.

Fig. 2 is a top plan of same but showing the parts positioned for making an angular cut.

Fig. 3 is a perspective view of the miter gauge showing the relation of its constituent parts.

Fig. 4 is an enlarged detail of one of the gauge members in its relation to an attaching clip that comprises a scale for determining the angular disposition of the saw guide slot with respect to the base board to which it is shown attached in Figs. 1 and 2.

For convenience of description of parts of the device shown in the drawings in their relation of one to another, the terms "horizontal" and "vertical," as herein used, should be understood to refer to normal positions of said parts when assembled and set up for use according to the illustrations in the drawings.

In the form shown in the drawings, the miter gauge consists generally of two main gauge members, each comprising a vertical guide arm, that is slotted longitudinally to serve as a saw guide, and a horizontal bracket arm. The horizontal bracket arms are telescopingly connected so that one will slide longitudinally with respect to the other and each of these bracket arms has pivotally mounted thereon an attaching clip, which comprises a vertical wing plate by means of which the device may be connected as shown in Figs. 1 and 2, to a baseboard upon which the board that is to be worked upon may be laid. One of these attaching clips is shaped so as to provide a circular scale member for indicating the angular disposition of the saw guide slots with respect to the edge of the baseboard to which the gauge members are attached.

In the form shown, the guide arm 1 has a saw guide slot 2 extending longitudinally thereof and stands vertically at one end of a horizontal bracket arm 3. These arms may be formed of a flat strip of metal that is bent at a right angle on a transverse line about midway of its length. A second vertical guide arm 4 having a longitudinal saw guide slot 5 is connected to a horizontal bracket arm 6 and the arms 3 and 6 are adapted to slide one upon the other in longitudinal telescopic relation to each other, as will be understood from Fig. 3.

In the form shown, this telescopic connection consists of clips 7 which may be integral with the arm 6 and bent to slidingly embrace the longitudinal side edges of the arm 3. The arm 6 has pivotally mounted thereon an angle clip 8 comprising an arm 9 that lies flat upon the arm 6 and is pivotally connected thereto on a perpendicular axis by a pin 10 so that it may be swung sidewise in a horizontal plane as indicated in Fig. 3. The clip 8 also comprises a vertical arm or wing 11 bent at right angles to the arm 9 and perforated at 12 to receive an attaching screw.

Likewise the arm 3 is pivotally connected at 13 to an attaching clip 14 which comprises a base plate 15 lying horizontally along the arm 3 and a vertical attaching plate or wing 16 that is integral with the plate 15. The axis of the pivot 13 is perpendicular to the arm 3 and lies in a plane defined by the longitudinal axes of the arms 1 and 3.

In order to provide a suitable angle gauge, the plate 15 has a circularly curved edge 17 concentric with the pivot that is mounted in the aperture 13. In this case the pivot is in the form of a threaded bolt 18 having a wing nut 19 by means of which the plate 15 may be tightly clamped to the arm 3. Scale graduations 20 on the plate 15 coact with an index 21 on the guide member 1 to indicate the angular setting of that guide member with respect to the vertical plate 16, which has perforations at 22 to receive screws whereby the plate 16 may be attached to the edge of a board, as shown in Figs. 1 and 2. The index 21 may, of course, be a pointer mark such as is shown in Fig. 4; or may be a projecting pointer attached to the face of the guide member 1, as will be understood.

The plate 15 is extended at both sides of the plate 16 and thus, in addition to serving as an angle scale member, it provides a ledge 23 for supporting a board 24 which will serve as the baseboard of an improvised miter box when the miter gauge is attached thereto.

In the form shown, where the horizontal arm 6 of the guide member 4 slides along the bottom of the horizontal arm 3 of the guide member 1, a shim 25 is inserted between the bar 6 and the clip 8, so that the upper surface of the arm 9 of that clip will lie in the same horizontal plane with the plate 23, and so that when the board 24 rests on these surfaces, the guide members 1 and 4 will at all times stand at right angles to the top plane of the board 24.

The arms 3 and 6 are each provided with one or more screw holes 26 and 27 respectively, whereby under certain circumstances these arms can be secured directly to the board 24 against angular shifting. Normally, close fitting nails or screws in the apertures 12 and 22 of the fastening clips will be sufficient to mount the parts of the gauge on the board 24 because of the fact that the arms 6 and 3 are kept alined through being in telescopic engagement with each other.

The operation of the device shown is as follows:

When not in use, the gauge members are adapted to be carried in the workman's tool box and may be either left in their telescopic relation or pulled apart as convenience of storage may require. When the workman is on the job and desires to use the miter gauge for the accurate cutting off of the ends of pieces of lumber, he selects a board 24 of suitable dimensions with parallel longitudinal edges that stand at right angles to the general plane of the board and attaches thereto a pair of upstanding guide members 28 which are simply nailed to that edge of the board 24 which is to serve as the front edge of the miter box, as indicated in Figs. 1 and 2. These strips 28 are spaced apart sufficiently to accommodate the miter gauge between them and are of sufficient length and height to serve as guides for a piece of timber that is to be trimmed. The miter gauge is then applied to the board with the upper surfaces of the arms 9 and 23 of the attaching clips bearing firmly against the under side of the board 24 and the plate 16 is firmly attached to the board by screws passing through the holes 22.

The guide member 4 is then shifted to the proper angular position with respect to the pivot 13, with the plate 11 of the clip 8 bearing against the rear edge of the board 24 as shown in Fig. 2. The arm 9 of the clip 8 will then stand at right angles to this edge of the board and when the plate 11 is fastened by a screw in the aperture 12, the saw guides 2 and 5 will be firmly held in their proper relation to each other. This adjustment is easily effected due to the pivotal connection of the clip 8 to the arm 6 at 10 and the telescopic connection 7 between the arms 6 and 3. The guide member 4 has a hole 5.1 in position to afford access by a screw driver to a screw in aperture 12, where the parts are in the position of Fig. 1.

The relation of the parts shown in Figs. 1, 2 and 3 serves for the guiding of the saw in most of the angular positions that are usually required for the trimming of the ends of timbers, but when it is necessary to cut such timbers at extremely sharp angles, the arms 6 and 3 can be pulled apart and independently fastened in their desired angular relation by means of screws passing through their apertures 27 and 26, thus assuring that the saw guides 2 and 5 will be fixed in proper relation to each other even though the arms 3 and 6 are pulled apart beyond the range of their telescopic connection.

Although but one specific embodiment of the invention is herein shown and described, it will be understood that numerous details of the construction shown may be altered or omitted without departing from the spirit of the invention as defined by the following claims.

I claim:

1. In a miter gauge, a pair of gauge members, each comprising a guide arm longitudinally slotted to form a saw guide and a bracket arm at right angles to said guide arm with its longitudinal axis lying in the plane of the saw-guiding-slot, and an attaching clip on each of said gauge members, each such clip comprising a plate lying upon and pivoted to the bracket arm of its respective gauge member on an axis perpendicular to such bracket arm and having a wing standing in a plane perpendicular to said plate said wing having means for attaching it to the edge of a board lying on said bracket arms, and means connecting the bracket arms of said gauge members in longitudinal telescoping relation to each other.

2. In a miter gauge, a pair of gauge members, each comprising a flat strip of sheet metal bent on an axis at right angles to its longitudinal center line to force a guide arm and a bracket arm at right angles to each other, said guide arm being slotted longitudinally to form a saw guide directed along a plane through the center line of its respective bracket arm, means connecting the bracket arms of said gauge members in longitudinal sliding relation one upon the other, and each said bracket arm having an attaching clip pivoted thereon on an axis perpendicular thereto and comprising a wing perpendicular to said bracket arm and having means for attaching said wing to the edge of a board overlying said bracket arms.

3. In a miter gauge, a pair of gauge members each comprising an elongated flat strip bent on a transverse axis to form a guide arm and a bracket arm lying in planes at right angles to each other and to the plane of their longitudinal axes, each said guide arm being slotted longitudinally to form a saw guide lying in the last-mentioned plane, means connecting the bracket arms of said gauge members in longitudinal telescoping relation to each other and each said bracket arm having an attaching clip pivoted thereon on an axis perpendicular thereto and lying in the plane defined by the longitudinal axes of the respective said guide and bracket arms, and each said clip having a wing perpendicular to the respective bracket arm, said wing having screw holes for attaching it to the edge of a board overlying said bracket arms.

BERTRAM C. DENNEY.

REFERENCES CITED

The following references are of record in the file of this patent:

UNITED STATES PATENTS

| Number | Name | Date |
| --- | --- | --- |
| 1,002,980 | Fish | Sept. 12, 1911 |

FOREIGN PATENTS

| Number | Country | Date |
| --- | --- | --- |
| 620,650 | Great Britain | Mar. 28, 1949 |